US011637369B2

(12) United States Patent
Wu et al.

(10) Patent No.: US 11,637,369 B2
(45) **Date of Patent: *Apr. 25, 2023**

(54) SIGNAL CONDITIONER, ANTENNA DEVICE AND MANUFACTURING METHOD

(71) Applicants: BEIJING BOE SENSOR TECHNOLOGY CO., LTD., Beijing (CN); BOE TECHNOLOGY GROUP CO., LTD., Beijing (CN)

(72) Inventors: Jie Wu, Beijing (CN); Tienlun Ting, Beijing (CN); Xiangzhong Kong, Beijing (CN); Liang Li, Beijing (CN); Xue Cao, Beijing (CN); Ying Wang, Beijing (CN); Haocheng Jia, Beijing (CN); Peizhi Cai, Beijing (CN); Chuncheng Che, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/885,137

(22) Filed: Aug. 10, 2022

(65) Prior Publication Data

US 2022/0393330 A1 Dec. 8, 2022

Related U.S. Application Data

(63) Continuation of application No. 16/763,404, filed as application No. PCT/CN2019/125091 on Dec. 13, 2019, now Pat. No. 11,462,826.

(30) Foreign Application Priority Data

Feb. 25, 2019 (CN) ........................ 201910137384.4

(51) Int. Cl.
*H04B 7/02* (2018.01)
*H01Q 3/28* (2006.01)
(Continued)

(52) U.S. Cl.
CPC ............... *H01Q 3/28* (2013.01); *H01P 1/184* (2013.01); *H01P 1/227* (2013.01); *H01P 3/081* (2013.01);
(Continued)

(58) Field of Classification Search
CPC ................................. H01Q 3/28; H01P 3/081
(Continued)

(56) References Cited

U.S. PATENT DOCUMENTS 9,531,077 B1 12/2016 Weller et al.
2016/0141754 A1 5/2016 Leyh et al.
(Continued)

FOREIGN PATENT DOCUMENTS

CN 101283480 A 10/2008
CN 105896082 A 8/2016
(Continued)

OTHER PUBLICATIONS

Zhang Jing. "Research and Design of Phased Array Reflective Array Antenna Based on Liquid Crystal Material". pp. 17-35.

*Primary Examiner* — Zewdu A Kassa
(74) *Attorney, Agent, or Firm* — The Webb Law Firm

(57) ABSTRACT

The present disclosure provides a signal conditioner, an antenna device and a manufacturing method. The signal conditioner includes: a microstrip line including a first portion and a second portion; an insulating layer including a first insulating layer covering the first portion; at least one electrode; a liquid crystal layer covering the microstrip line, the insulating layer, and the at least one electrode; and a common electrode line. A first end of the first portion is
(Continued)

connected to a first end of the second portion. A second end of the first portion is connected to a second end of the second portion. The at least one electrode includes a first electrode on a side of the first insulating layer facing away from the first portion. The common electrode line is on a side of the liquid crystal layer facing away from the microstrip line.

17 Claims, 9 Drawing Sheets

(51) Int. Cl.

| | |
|---|---|
| ***H01P 3/08*** | (2006.01) |
| ***H01Q 21/00*** | (2006.01) |
| ***H01P 1/18*** | (2006.01) |
| ***H01P 1/22*** | (2006.01) |

(52) U.S. Cl.
CPC ..... *H01Q 21/0075* (2013.01); *H01Q 21/0087* (2013.01)

(58) Field of Classification Search
USPC ....... 375/267, 262, 260, 259, 295, 219, 316; 342/372
See application file for complete search history.

(56) References Cited

U.S. PATENT DOCUMENTS

| | | | |
|---|---|---|---|
| 2018/0217456 A1* | 8/2018 | Vilenskiy | .......... G02F 1/134309 |
| 2020/0099115 A1 | 3/2020 | Sun | |

FOREIGN PATENT DOCUMENTS

| | | |
|---|---|---|
| CN | 108493553 A | 9/2018 |
| CN | 108736135 A | 11/2018 |
| CN | 108808181 A | 11/2018 |
| CN | 108828811 A | 11/2018 |
| CN | 109164608 A | 1/2019 |
| CN | 109921190 A | 6/2019 |
| EP | 3611794 A1 | 2/2020 |

* cited by examiner

SIGNAL CONDITIONER, ANTENNA DEVICE AND MANUFACTURING METHOD

CROSS-REFERENCE TO RELATED APPLICATIONS

The present application is a Continuation Application of U.S. National Stage application Ser. No. 16/763,404 under 35 U.S.C. § 371 of International Patent Application No. PCT/CN2019/125091, filed on Dec. 13, 2019, which claims priority of China Patent Application No. 201910137384.4, filed on Feb. 25, 2019, the disclosures of which are incorporated by reference herein in entirety.

TECHNICAL FIELD

The present disclosure relates to a signal conditioner, an antenna device, and a manufacturing method.

BACKGROUND

Phase shifters and attenuators are widely used in electronic communication systems and are the core components of phased array radar, synthetic aperture radar, radar electronic countermeasures, satellite communications, and transceivers. Through the combined effect of a phase shifter and an attenuator, sidelobes of a directional pattern of the antenna can be reduced, and antenna scanning and other features can be achieved. In the related art, a liquid crystal phased array antenna has appeared. This phased array antenna based on liquid crystal material can achieve the scanning function of an antenna beam.

SUMMARY

According to an aspect of an embodiment of the present disclosure, a signal conditioner is provided. The signal conditioner comprises: a microstrip line comprising a first portion and a second portion, wherein a first end of the first portion is connected to a first end of the second portion, and a second end of the first portion is connected to a second end of the second portion; an insulating layer comprising a first insulating layer covering the first portion; at least one electrode comprising a first electrode on a side of the first insulating layer facing away from the first portion; a liquid crystal layer covering the microstrip line, the insulating layer and the at least one electrode; and a common electrode line on a side of the liquid crystal layer facing away from the microstrip line.

In some embodiments, the insulating layer further comprises a second insulating layer covering the second portion; and the at least one electrode further comprises a second electrode on a side of the second insulating layer facing away from the second portion, the second electrode being isolated from the first electrode by a portion of the liquid crystal layer.

In some embodiments, a length L1 of the first electrode and a length L2 of the second electrode satisfy the following condition:

$$L1 = L2 \geq \frac{c}{2f\left(\sqrt{\varepsilon_{\parallel}} - \sqrt{\varepsilon_{\perp}}\right)},$$

where c is a speed of light, f is a frequency of a transmitted signal, $\varepsilon_{\parallel}$ is a dielectric constant of liquid crystals in a case where an arrangement direction of long axis of liquid crystal molecules is parallel to a direction of a driving electric field applied to the liquid crystals, and $\varepsilon_{\perp}$ is a dielectric constant of liquid crystals in a case where the arrangement direction of the long axis of the liquid crystal molecules is perpendicular to the direction of the driving electric field applied to the liquid crystals.

In some embodiments, a width of the first electrode is equal to a width of the second electrode.

In some embodiments, the first portion and the second portion each has a curved shape.

In some embodiments, the microstrip line further comprises a third portion, a first end of the third portion being connected to the second end of the first portion; the insulating layer further comprises a third insulating layer covering the third portion; and the at least one electrode further comprises a third electrode on a side of the third insulating layer facing away from the third portion, the third electrode being isolated from the first electrode and the second electrode by a portion of the liquid crystal layer.

In some embodiments, a length L3 of the third electrode satisfies the following condition:

$$L3 \geq \frac{c}{f\left(\sqrt{\varepsilon_{\parallel}} - \sqrt{\varepsilon_{\perp}}\right)},$$

where c is a speed of light, f is a frequency of a transmitted signal, $\varepsilon_{\parallel}$ is a dielectric constant of liquid crystals in a case where an arrangement direction of long axis of liquid crystal molecules is parallel to a direction of a driving electric field applied to the liquid crystals, and $\varepsilon_{\perp}$ is a dielectric constant of liquid crystals in a case where the arrangement direction of the long axis of the liquid crystal molecules is perpendicular to the direction of the driving electric field applied to the liquid crystals.

In some embodiments, the signal conditioner further comprises: a first radio frequency port connected to the first end of the first portion; and a second radio frequency port connected to a second end of the third portion.

In some embodiments, the second portion and the first portion are arranged symmetrically with respect to a line where an extension direction of the first radio frequency port is located.

In some embodiments, the signal conditioner further comprising a first substrate and a second substrate, wherein: the microstrip line, the insulating layer, the at least one electrode, the liquid crystal layer, and the common electrode line are between the first substrate and the second substrate; the microstrip line, the insulating layer, and the at least one electrode are on the first substrate; and the common electrode line is on the second substrate.

According to another aspect of an embodiment of the present disclosure, an antenna device is provided. The antenna device comprises: at least one signal conditioner as described above; and at least one antenna circuit, each of the at least one antenna circuit being electrically connected to one signal conditioner.

In some embodiments, the antenna device further comprises a signal transmission circuit, the signal transmission circuit comprising at least one of a power splitter or a combiner, wherein: the at least one signal conditioner comprises a plurality of signal conditioners; the at least one antenna circuit comprises a plurality of antenna circuits; and the signal transmission circuit is electrically connected to the plurality of signal conditioners.

According to another aspect of an embodiment of the present disclosure, a manufacturing method for a signal conditioner is provided. The manufacturing method comprises: forming a microstrip line on a first substrate, wherein the microstrip line comprises a first portion and a second portion, a first end of the first portion being connected to a first end of the second portion, and a second end of the first portion being connected to a second end of the second portion; forming an insulating layer on a side of the microstrip line facing away from the first substrate, wherein the insulating layer comprises a first insulating layer covering the first portion; forming at least one electrode on a side of the insulating layer facing away from the microstrip line, wherein the at least one electrode comprises a first electrode formed on a side of the first insulating layer facing away from the first portion; introducing a liquid crystal layer on the first substrate, the liquid crystal layer covering the microstrip line, the insulating layer and the at least one electrode; forming a common electrode line on a second substrate; and engaging the first substrate to the second substrate to make the liquid crystal layer and the common electrode line be between the first substrate and the second substrate.

In some embodiments, the insulating layer further comprises a second insulating layer covering the second portion in the forming of the insulating layer; and the at least one electrode further comprises a second electrode formed on a side of the second insulating layer facing away from the second portion in the forming of the at least one electrode, the second electrode being isolated from the first electrode.

In some embodiments, the microstrip line further comprises a third portion in the forming of the microstrip line, a first end of the third portion being connected to the second end of the first portion; the insulating layer further comprises a third insulating layer covering the third portion in the forming of the insulating layer; and the at least one electrode further comprises a third electrode formed on a side of the third insulating layer facing away from the third portion in the forming of the at least one electrode, the third electrode being isolated from the first electrode and the second electrode, respectively.

According to another aspect of an embodiment of the present disclosure, a manufacturing method for a signal conditioner is provided. The manufacturing method comprises: forming a microstrip line on a first substrate, wherein the microstrip line comprises a first portion and a second portion, a first end of the first portion being connected to a first end of the second portion, and a second end of the first portion being connected to a second end of the second portion; forming an insulating layer on a side of the microstrip line facing away from the first substrate, wherein the insulating layer comprises a first insulating layer covering the first portion; forming at least one electrode on a side of the insulating layer facing away from the microstrip line, wherein the at least one electrode comprises a first electrode formed on a side of the first insulating layer facing away from the first portion; forming a common electrode line on a second substrate; engaging the first substrate to the second substrate to make the microstrip line, the insulating layer, the at least one electrode and the common electrode line be between the first substrate and the second substrate; and introducing liquid crystals between the first substrate and the second substrate to form a liquid crystal layer covering the microstrip line, the insulating layer, and the at least one electrode, wherein a portion of the liquid crystal layer is between the microstrip line and the common electrode line.

In some embodiments, the insulating layer further comprises a second insulating layer covering the second portion in the forming of the insulating layer; and the at least one electrode further comprises a second electrode formed on a side of the second insulating layer facing away from the second portion in the forming of the at least one electrode, the second electrode being isolated from the first electrode.

In some embodiments, the microstrip line further comprises a third portion in the forming of the microstrip line, a first end of the third portion being connected to the second end of the first portion; the insulating layer further comprises a third insulating layer covering the third portion in the forming of the insulating layer; and the at least one electrode further comprises a third electrode formed on a side of the third insulating layer facing away from the third portion in the forming of the at least one electrode, the third electrode being isolated from the first electrode and the second electrode, respectively.

In some embodiments, an extension direction of the first electrode is the same as an extension direction of the first portion of the microstrip line.

In some embodiments, an extension direction of the second electrode is the same as an extension direction of the second portion of the microstrip line.

In some embodiments, an extension direction of the third electrode is the same as an extension direction of the third portion of the microstrip line.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which:

FIG. 2B is also a cross-sectional view showing a structure of the signal conditioner taken along line D-D' in FIG. 3A according to another embodiment of the present disclosure;

Figure 1A:
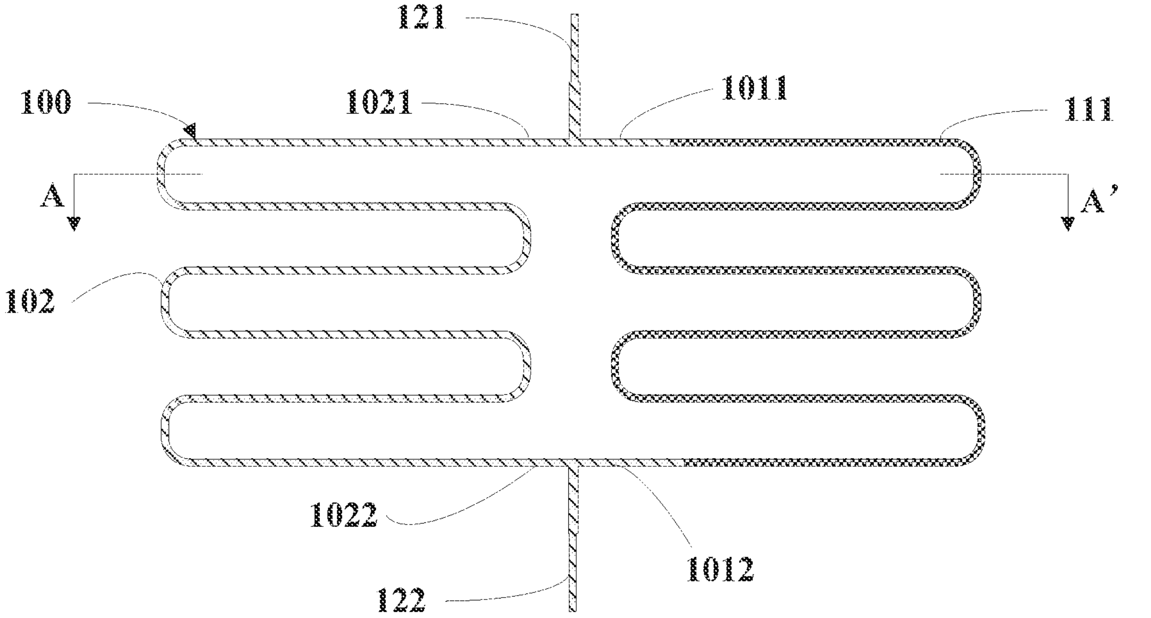
FIG. 1A is a top view showing a signal conditioner according to an embodiment of the present disclosure.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail in conjunction with the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms “first”, “second” and similar words in the present disclosure do not denote any order, quantity or importance, but are merely used to distinguish between different parts. A word such as “comprise”, “include”, or the like means that the element before the word covers the element(s) listed after the word without excluding the possibility of also covering other elements. The terms “up”, “down”, “left”, “right”, or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors of the present disclosure have found that the liquid crystal phased array antenna in the related art may not be used to adjust an amplitude of electromagnetic wave signals. This makes it difficult to reduce sidelobes of the directional pattern of the liquid crystal phased array antenna. In view of this, the embodiments of the present disclosure provide a signal conditioner so that the amplitude of the electromagnetic wave signal may be adjusted.

The signal conditioner according to some embodiments of the present disclosure will be described in detail below with reference to the drawings.

Figure 1B:
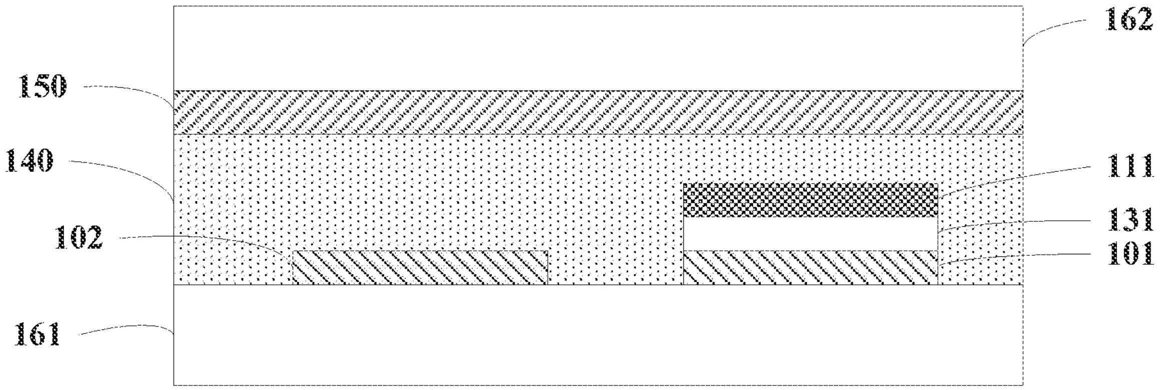
FIG. 1B is a cross-sectional view showing a structure of a signal conditioner taken along line A-A' in FIG. 1A according to an embodiment of the present disclosure.

FIG. 1A is a top view showing a signal conditioner according to an embodiment of the present disclosure. FIG. 1B is a cross-sectional view showing a structure of a signal conditioner taken along line A-A' in FIG. 1A according to an embodiment of the present disclosure. A structure of the signal conditioner according to some embodiments of the present disclosure will be described in detail below with reference to FIGS. 1A and 1B.

In some embodiments, as shown in FIGS. 1A and 1B, the signal conditioner comprises a microstrip line 100, an insulating layer, at least one electrode, a liquid crystal layer 140 and a common electrode line 150.

As shown in FIGS. 1A and 1B, the microstrip line 100 comprises a first portion 101 and a second portion 102. A first end 1011 of the first portion 101 is connected to a first end 1021 of the second portion 102. A second end 1012 of the first portion 101 is connected to a second end 1022 of the second portion 102. The first portion 101 and the second portion 102 each may have a curved shape. For example, the first portion 101 may comprise a plurality of bending portions, and the second portion 102 may also comprise a plurality of bending portions.

In some embodiments, as shown in FIG. 1A, the second portion 102 and the first portion 101 of the microstrip line may be arranged symmetrically with respect to a line where an extension direction of a first radio frequency port 121 (or a second radio frequency port 122, which will be described later). Of course, the scope of the embodiments of the present disclosure is not limited to this. For example, the second portion 102 and the first portion 101 of the microstrip line may be arranged asymmetrically with respect to the line.

As shown in FIG. 1B, the insulating layer comprises a first insulating layer 131 covering the first portion 101. For example, the insulating layer may be a passivation layer. For example, a material of the insulating layer may comprise silicon dioxide, silicon nitride, or the like.

As shown in FIGS. 1A and 1B, the at least one electrode comprises a first electrode 111. The first electrode 111 is on a side of the first insulating layer 131 facing away from the first portion 101. The first electrode 111 is on a surface of the first insulating layer 131. The first electrode 111 is isolated from the first portion 101 of the microstrip line by the first insulating layer 131. For example, a material of the first electrode 111 may comprise a conductive material such as ITO (Indium Tin Oxide) or a metal.

In some embodiments, as shown in FIG. 1A, an extension direction of the first electrode 111 is the same as an extension direction of the first portion 101 of the microstrip line.

As shown in FIG. 1B, the liquid crystal layer 140 covers the microstrip line 100, the insulating layer (for example, the first insulating layer 131), and the at least one electrode (for example, the first electrode 111).

As shown in FIG. 1B, the common electrode line 150 is located on a side of the liquid crystal layer 140 facing away from the microstrip line 100. This causes a portion of the liquid crystal layer 140 to be located between the common electrode line 150 and the microstrip line 100. For example, the common electrode line 150 may be a ground electrode line.

In the above embodiments, the signal conditioner according to some embodiments of the present disclosure is provided. In the signal conditioner, the microstrip line comprises a first portion and a second portion. A first insulating layer is provided on the first portion. A first electrode is provided on the first insulating layer. In this way, the first electrode is isolated from the first portion of the microstrip line by the first insulating layer. In the signal conditioner, the liquid crystal layer covers the microstrip line, the insulating layer, and the electrode. A common electrode line is provided on a side of the liquid crystal layer facing away from the microstrip line. The signal conditioner may be used to adjust an amplitude of an electromagnetic wave signal.

In the transmission of an electromagnetic wave signal, a common potential (such as a ground potential) is applied to the common electrode line. The electromagnetic wave signal is input to the signal conditioner through one end of the microstrip line and is transmitted along a portion of the liquid crystal layer between the microstrip line and the common electrode line. In the signal conditioner, the microstrip line comprises a first portion and a second portion. Therefore, the electromagnetic wave signal is respectively transmitted along two branches, wherein a first branch of the two branches is a portion of the liquid crystal layer between the first portion and the common electrode line, and a second branch of the two branches is a portion of the liquid crystal layer between the second portion and the common electrode line. During the transmission of the electromagnetic wave signal, the amplitude of the electromagnetic wave signal may be adjusted by applying a voltage to the at least one electrode. For example, a voltage is applied to the first electrode so that the dielectric constant of the portion of the liquid crystal layer in the first branch changes. Since no electrode is provided above the second portion of the microstrip line, the dielectric constant of the portion of the liquid crystal layer in the second branch does not change. The liquid crystal layer will have different dielectric constants under different voltages, and the phase constant of the electromagnetic wave signal will be different when the electromagnetic wave signal propagates in the medium with different dielectric constants. Under the same propagation length, different propagation phase constants will produce different phases. Two signals of different phases may be combined, and the amplitude of the combined electromagnetic wave signal will change. Therefore, the amplitude of the electromagnetic wave signal changes after the combination of electromagnetic wave signals transmitted along the above two portions of the liquid crystal layer. Therefore, the signal conditioner of the above embodiment of the present disclosure may achieve the adjustment of the amplitude of the electromagnetic wave signal.

In some embodiments, an antenna device is enabled to change the amplitude of an electromagnetic wave signal in a case where the signal conditioner is applied to the antenna device. Through changing the amplitude of the electromagnetic wave signal, the sidelobes of the directional pattern of the antenna device may be reduced, thereby improving the anti-interference ability of the antenna device.

In some embodiments, as shown in FIG. 1A, the signal conditioner may further comprise a first radio frequency port 121 connected to the first end 1011 of the first portion 101 (or the first end 1021 of the second portion 102) and a second radio frequency port 122 connected to the second end 1022 of the second portion 102 (or the second end 1012 of the first portion 101). Here, the first radio frequency port 121 and the second radio frequency port 122 may be used as input and output ports, respectively.

In some embodiments, materials of the first radio frequency port 121 and the second radio frequency port 122 are the same as a material of the microstrip line 100. In this way, in the manufacturing process, these two radio frequency ports may be formed during the formation of the microstrip line to facilitate the manufacture thereof.

In some embodiments, as shown in FIG. 1B, the signal conditioner further comprises a first substrate 161 and a second substrate 162. The microstrip line 100, the insulating layer (such as the first insulating layer 131 in FIG. 1B), the at least one electrode (such as the first electrode 111 in FIG. 1B), the liquid crystal layer 140, and the common electrode line 150 are between the first the substrate 161 and the second substrate 162. The microstrip line 100, the insulating layer and the at least one electrode are on the first substrate 161. The common electrode line 150 is on the second substrate 162. These two substrates may support and protect the various structural layers.

Figure 2A:
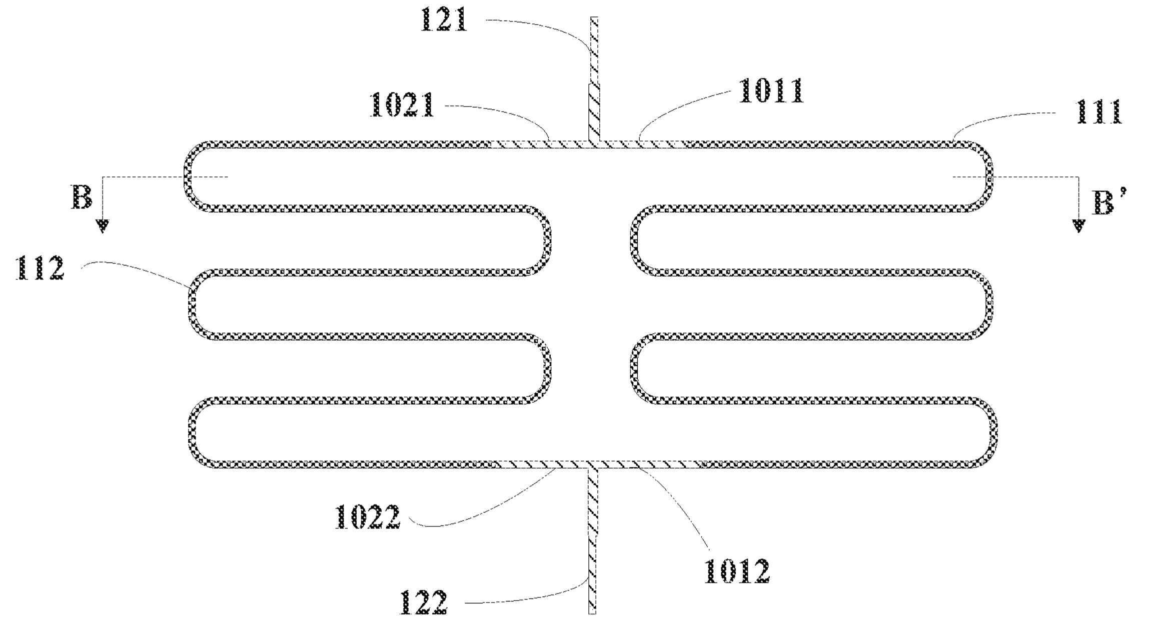
FIG. 2A is a top view showing a signal conditioner according to another embodiment of the present disclosure.
Figure 3A:
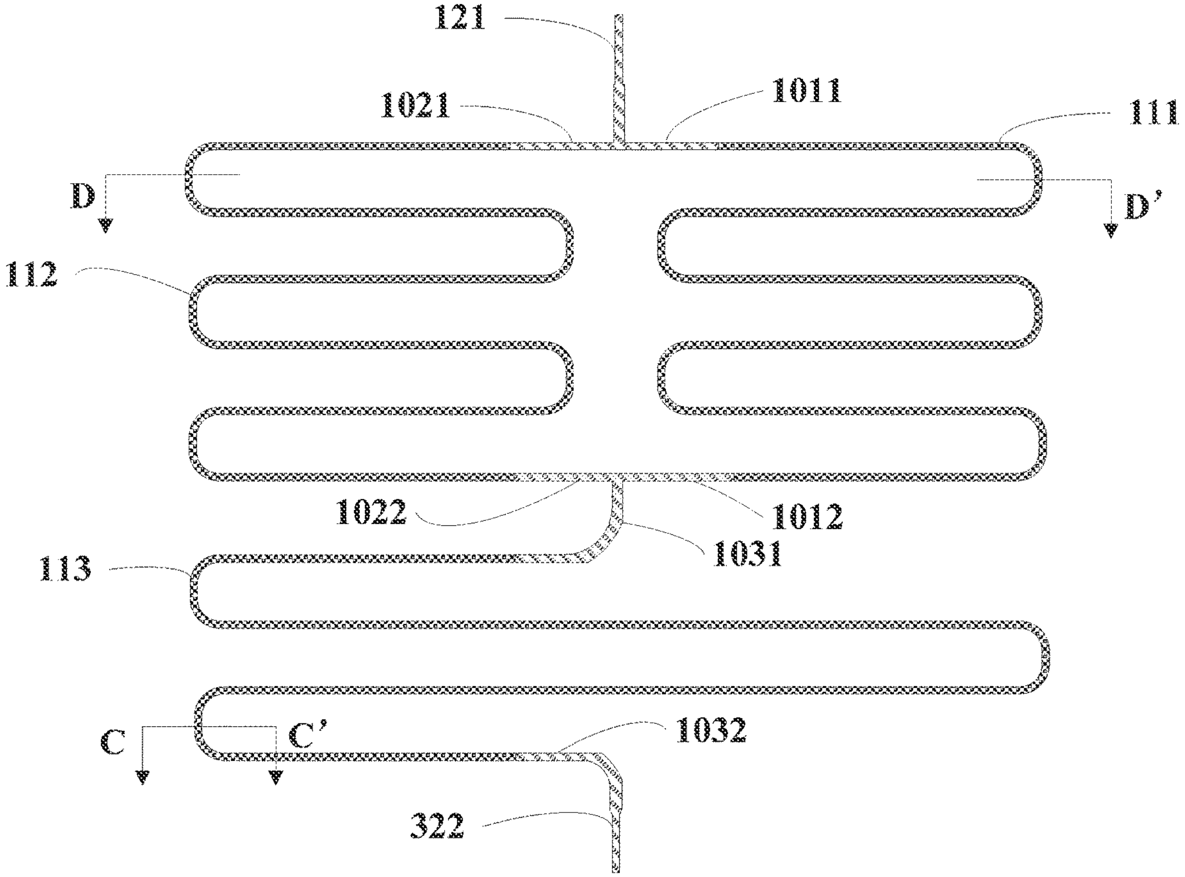
FIG. 3A is a top view showing a signal conditioner according to another embodiment of the present disclosure.

It should be noted that the first substrate, the second substrate, the common electrode line and the liquid crystal layer are not shown in FIG. 1A for convenience of illustrating the microstrip line and the electrode. In addition, FIG. 1A shows the structural relationship between the microstrip line and the electrode in a top view. However, in fact the microstrip line is isolated from the electrode as shown in the cross-sectional view (for example, FIG. 1B). FIGS. 2A and 3A below are similar to FIG. 1A.

Figure 2B:
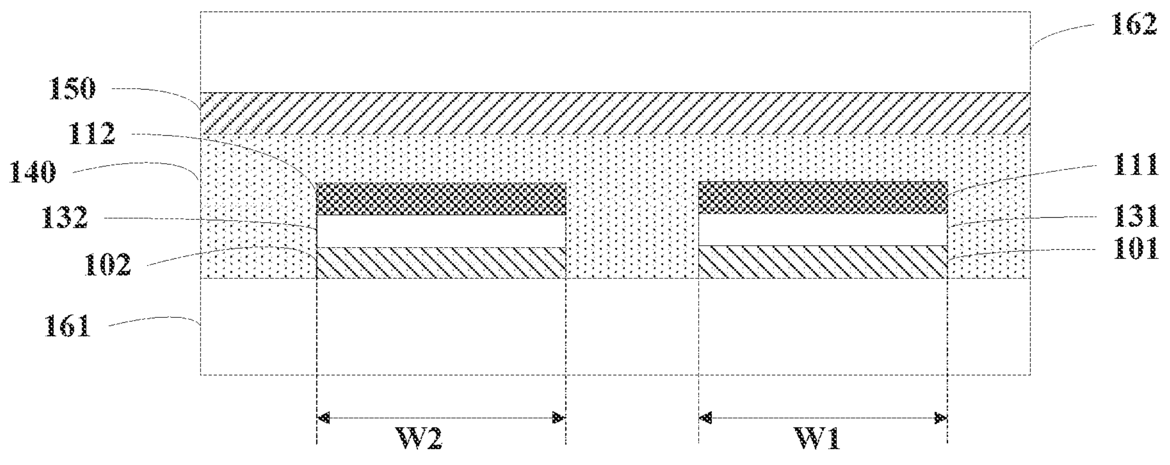
FIG. 2B is a cross-sectional view showing a structure of a signal conditioner taken along line B-B' in FIG. 2A according to another embodiment of the present disclosure; moreover.

FIG. 2A is a top view showing a signal conditioner according to another embodiment of the present disclosure. FIG. 2B is a cross-sectional view showing a structure of a signal conditioner taken along line B-B' in FIG. 2A according to another embodiment of the present disclosure. As shown in FIGS. 2A and 2B, the signal conditioner comprises some structures that are the same as or similar to those shown in FIGS. 1A and 1B.

In some embodiments, as shown in FIG. 2B, the insulating layer further comprises a second insulating layer 132 covering the second portion 102 of the microstrip line.

In some embodiments, as shown in FIGS. 2A and 2B, the at least one electrode may further comprise a second electrode 112. The second electrode 112 is on a side of the second insulating layer 132 facing away from the second portion 102. The second electrode 112 is on a surface of the second insulating layer 132. The second electrode 112 is isolated from the second portion 102 of the microstrip line by the second insulating layer 132. The second electrode 112 is isolated from the first electrode 111 by a portion of the liquid crystal layer 140. In some embodiments, an extension direction of the second electrode is the same as an extension direction of the second portion of the microstrip line.

In this way, in the signal conditioner of this embodiment, the first electrode is provided above the first portion of the microstrip line, and the second electrode is provided above the second portion of the microstrip line. Therefore, in the process of adjusting an amplitude of an electromagnetic wave signal, different voltages may be applied to the first electrode and the second electrode, thereby changing the dielectric constants of portions of the liquid crystal layer in different branches, so that the phases of the electromagnetic wave signals respectively transmitted along the portions of the liquid crystal layer in the two branches may be adjusted. In this way, after combining the electromagnetic wave signals of different phases into one electromagnetic wave signal, the amplitude of the combined electromagnetic wave signal changes. The amplitude of the electromagnetic wave signal may be adjusted more conveniently by the signal conditioner of this embodiment.

In some embodiments, a length of the first electrode 111 is equal to a length of the second electrode 112. This may reduce the uncontrollable influence of the two electrodes on the signal, and is conducive to the controllable adjustment of the amplitude of the signal. It should be noted that the length of the electrode refers to a dimension of the electrode along an extension direction of the microstrip line. For example, the length of the first electrode refers to a dimension of the first electrode along an extension direction of the first portion of the microstrip line, and the length of the second electrode refers to a dimension of the second electrode along an extension direction of the second portion of the microstrip line.

For example, assume that material properties of liquid crystal molecules are $\varepsilon_\perp$ and tan $\delta_\perp$ when the liquid crystal molecules are perpendicular to the electric field, and the material properties of the liquid crystal molecules are $\varepsilon_\parallel$ and tan $\delta_\parallel$ when the liquid crystal molecules are parallel to the electric field. The length L1 of the first electrode 111 and the length L2 of the second electrode 112 satisfy the following condition:

$$L1 = L2 \geq \frac{c}{2f\left(\sqrt{\varepsilon_\parallel} - \sqrt{\varepsilon_\perp}\right)}, \tag{1}$$

where c is a speed of light, f is a frequency of a transmitted signal, $\varepsilon_\parallel$ is a dielectric constant of liquid crystals in a case where an arrangement direction of long axis of liquid crystal molecules is parallel to a direction of a driving electric field applied to the liquid crystals, and $\varepsilon_\perp$ is a dielectric constant of liquid crystals in a case where the arrangement direction of the long axis of the liquid crystal molecules is perpendicular to the direction of the driving electric field applied to the liquid crystals. The length L1 of the first electrode 111 and the length L2 of the second electrode 112 satisfy the condition of the above relation (1), which may increase the dynamic range of signal attenuation, that is, the range of amplitude adjustment is relatively large.

The derivation of the above relation (1) will be described below.

For an electromagnetic wave that propagates in a medium (for example, the dielectric constant of the medium is $\varepsilon$), the wavelength $\lambda_g$ of the electromagnetic wave is:

$$\lambda_g = \frac{c}{f\sqrt{\varepsilon}}. \tag{2}$$

Therefore, when the electromagnetic wave propagates in a liquid crystal media with a dielectric constant $\varepsilon_\parallel$, the wavelength $\lambda_{g\parallel}$ of the electromagnetic wave is:

$$\lambda_{g\parallel} = \frac{c}{f\sqrt{\varepsilon_\parallel}}, \tag{3}$$

and when the electromagnetic wave propagates in a liquid crystal medium with a dielectric constant $\varepsilon_\perp$, the wavelength $\lambda_{g\perp}$ of the electromagnetic wave is:

$$\lambda_{g\perp} = \frac{c}{f\sqrt{\varepsilon_\perp}}. \tag{4}$$

The phase $\phi$ of an electromagnetic wave propagating in a medium is $$\phi = \frac{L}{\lambda_g} * 2\pi, \tag{5}$$

where L is a propagation length.

Taking the propagation along the portion of the liquid crystal layer on the first electrode 111 as an example, the propagation length is the length L1 of the first electrode. The phase $\Phi_\parallel$ of the electromagnetic wave propagating in the liquid crystal medium with the dielectric constant of $\varepsilon_\parallel$ is $$\phi_\parallel = \frac{L1}{\lambda_{g\parallel}} * 2\pi. \tag{6}$$

The phase $\Phi_\perp$ of the electromagnetic wave propagating in the liquid crystal medium with the dielectric constant $\varepsilon_\perp$ is $$\phi_\perp = \frac{L1}{\lambda_{g\perp}} * 2\pi. \tag{7}$$

The phase change $\Delta\Phi$ of the electromagnetic wave is $$\Delta\phi = \phi_{\parallel} - \phi_{\perp} = \frac{2\pi f L1\left(\sqrt{\varepsilon_{\parallel}} - \sqrt{\varepsilon_{\perp}}\right)}{c}. \quad (8)$$

If the electromagnetic wave satisfies the condition of $\Delta\phi \geq \pi$, a phase difference greater than or equal to $\pi$ may be generated during propagation of the electromagnetic wave. In the case of $\Delta\phi \geq \pi$, $$L1 \geq \frac{c}{2f\left(\sqrt{\varepsilon_{\parallel}} - \sqrt{\varepsilon_{\perp}}\right)}. \quad (9)$$

Similarly, it can be calculated $$L2 \geq \frac{c}{2f\left(\sqrt{\varepsilon_{\parallel}} - \sqrt{\varepsilon_{\perp}}\right)}. \quad (10)$$

In this way, the above relationship (1) may be obtained in the case where the length L1 of the first electrode 111 is equal to the length L2 of the second electrode 112.

In addition, $\tan \delta_{\perp}$ is the tangent of the loss angle exhibited by the material when the arrangement direction of the liquid crystal molecules is perpendicular to the direction of the electric field; and $\tan \delta_{\parallel}$ is the tangent of the loss angle exhibited by the material when the arrangement direction of the liquid crystal molecules is parallel to the direction of the electric field. The amplitude adjustment range of the signal conditioner is related to the value ranges of $\tan \delta_{\perp}$ and $\tan \delta_{\parallel}$.

Through simulation, when $(\tan \delta_{\perp} - \tan \delta_{\parallel})/\tan \delta_{\perp} = 0.7$, the amplitude adjustment range of the signal conditioner is 0-17 dB. If the dynamic range of the difference between $\tan \delta_{\perp}$ and $\tan \delta_{\parallel}$ (i.e., $\tan \delta_{\perp} - \tan \delta_{\parallel}$) is further reduced, the amplitude adjustment range of the signal conditioner may be further increased. That is, the amplitude adjustment range of the signal conditioner is inversely related to the dynamic range of the difference between $\tan \delta_{\perp}$ and $\tan \delta_{\parallel}$.

In some embodiments, as shown in FIG. 2A, the first electrode 111 and the second electrode 112 may be symmetrically arranged with respect to the line where the extension direction of the first radio frequency port 121 (or the second radio frequency port 122) is located. By symmetrically arranging the two electrodes, the amplitude of the electromagnetic wave signal may be easily adjusted. Of course, those skilled in the art should understand that the first electrode 111 and the second electrode 112 may also be arranged asymmetrically with respect to the line.

In some embodiments, as shown in FIG. 2B, a width W1 of the first electrode 111 is equal to a width W2 of the second electrode 112. In this way, it is possible to ensure that the losses on the two branches are the same. Here, it should be noted that the width of the electrode refers to a lateral dimension of the electrode in the cross-sectional view. For example, the width of the first electrode 111 refers to a lateral dimension of the first electrode in FIG. 2B, and the width of the second electrode 112 refers to a lateral dimension of the second electrode in FIG. 2B.

Figure 3B:
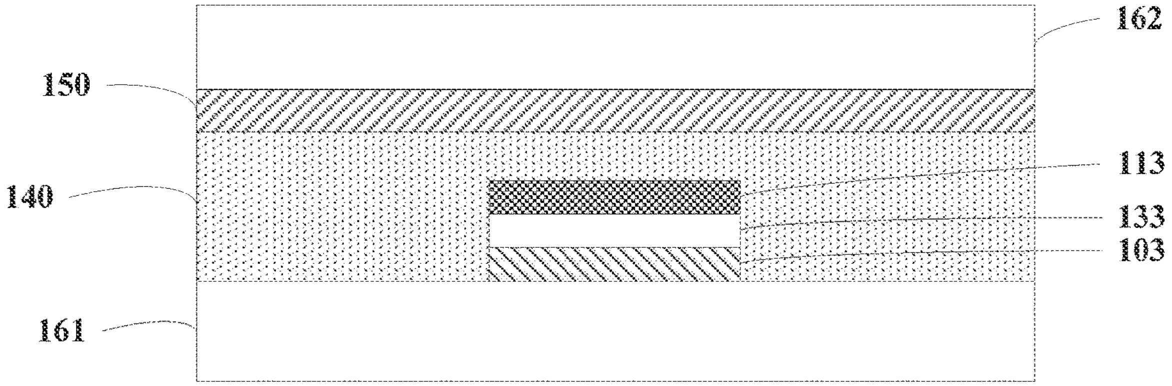
FIG. 3B is a cross-sectional view showing a structure of a signal conditioner taken along line C-C' in FIG. 3A according to another embodiment of the present disclosure.

FIG. 3A is a top view showing a signal conditioner according to another embodiment of the present disclosure. FIG. 3B is a cross-sectional view showing a structure of a signal conditioner taken along line C-C' in FIG. 3A according to another embodiment of the present disclosure. In addition, the cross-sectional view of the structure taken along the line D-D' in FIG. 3A may be referred to as shown in FIG. 2B. The signal conditioner shown in FIG. 3A comprises some structures that are the same as or similar to those shown in FIGS. 2A and 2B.

In some embodiments, as shown in FIGS. 3A and 3B, the microstrip line 100 may further comprise a third portion 103. A first end 1031 of the third portion 103 is connected to the second end 1012 of the first portion 101. The insulating layer may further comprise a third insulating layer 133 covering the third portion 103. The at least one electrode may further comprise a third electrode 113. The third electrode 113 is on a side of the third insulating layer 133 facing away from the third portion 103. The third electrode 113 is on a surface of the third insulating layer 133. The third electrode 113 is isolated from the third portion 103 of the microstrip line by the third insulating layer 133. The third electrode 113 is isolated from the first electrode 111 and the second electrode 112 by a portion of the liquid crystal layer 140. In some embodiments, an extension direction of the third electrode is the same as an extension direction of the third portion of the microstrip line.

In the embodiment, the third portion of the microstrip line, the third insulating layer, and the third electrode are provided in the signal conditioner. During the transmission of an electromagnetic wave signal in the signal conditioner, the electromagnetic wave signal may be transmitted in a portion of the liquid crystal layer between the third portion of the microstrip line and the common electrode line. A dielectric constant of the portion of the liquid crystal layer may be changed by applying a voltage to the third electrode. This may change the phase of the transmitted electromagnetic wave signal. Therefore, in addition to the controllable adjustment of the amplitude of the electromagnetic wave signal achieved by the signal conditioner shown in FIG. 2A, the signal conditioner shown in FIG. 3A may further achieve the controllable adjustment of the phase of the electromagnetic wave signal.

In the case where the signal conditioner is applied to an antenna device, the antenna device may achieve the purpose of changing the amplitude and the phase of an electromagnetic wave signal. This may more conveniently reduce sidelobes of the directional pattern of the antenna device, thereby improving the anti-interference ability of the antenna device.

In some embodiments, a length L3 of the third electrode 113 satisfies the following condition:

$$L3 \geq \frac{c}{f\left(\sqrt{\varepsilon_{\parallel}} - \sqrt{\varepsilon_{\perp}}\right)}, \quad (11)$$

where c is a speed of light, f is a frequency of a transmitted signal, $\varepsilon_{\parallel}$ is a dielectric constant of liquid crystals in a case where an arrangement direction of long axis of liquid crystal molecules is parallel to a direction of a driving electric field applied to the liquid crystals, and $\varepsilon_{\perp}$ is a dielectric constant of liquid crystals in a case where the arrangement direction of the long axis of the liquid crystal molecules is perpendicular to the direction of the driving electric field applied to the liquid crystals. The length L3 of the third electrode 113 satisfies the condition of the above relationship (11), so that a signal phase difference of 360 degrees may be achieved.

Regarding the above relationship (11), it can be obtained by a derivation process similar to that described above. The electromagnetic wave propagates along a portion of the liquid crystal layer on the third electrode 113, then the phase change of the electromagnetic wave ΔΦ is $$\Delta\phi = \phi_{\|} - \phi_{\perp} = \frac{2\pi f L3(\sqrt{\varepsilon_{\|}} - \sqrt{\varepsilon_{\perp}})}{c}. \quad (12)$$

If the electromagnetic wave can satisfy the condition of ΔØ>2π, a phase difference greater than or equal to 2π may be generated in the propagation process of the electromagnetic wave. In the case of ΔØ>2π, the following relationship may be obtained:

$$L3 \geq \frac{c}{f(\sqrt{\varepsilon_{\|}} - \sqrt{\varepsilon_{\perp}})}. \quad (11)$$

In some embodiments, the width of the first electrode 111, the width of the second electrode 112, and a width of the third electrode 113 are all equal to a width of the microstrip line 100. This may reduce the uncontrollable influence of the three electrodes on the signal.

In other embodiments, the width of the first electrode 111, the width of the second electrode 112, and the width of the third electrode 113 may not be equal to the width of the microstrip line 100. For example, the width of each of the three electrodes may not exceed twice the width of the microstrip line.

In some embodiments, as shown in FIG. 3A, the signal conditioner may further comprise a first radio frequency port 121 connected to the first end 1011 of the first portion 101 and a second radio frequency port 322 connected to a second end 1032 of the third portion 103. Here, the first radio frequency port 121 and the second radio frequency port 322 may be used as input and output ports, respectively.

In some embodiments, materials of the first radio frequency port 121 and the second radio frequency port 322 are the same as a material of the microstrip line 100. In this way, in the manufacturing process, these two radio frequency ports may be formed during the formation of the microstrip line to facilitate the manufacture thereof.

In some embodiments of the present disclosure, the above liquid crystal-based amplitude and phase conditioner may be used to adjust the amplitude or phase of the signal independently, or may be used to also adjust both the amplitude and the phase of the signal. The amplitude and phase conditioner may be applied to a phased array antenna. Diversity may be achieved when shaping antenna patterns. By reducing sidelobes of the directional pattern of the antenna, the anti-interference ability of the antenna may be improved.

Figure 4:
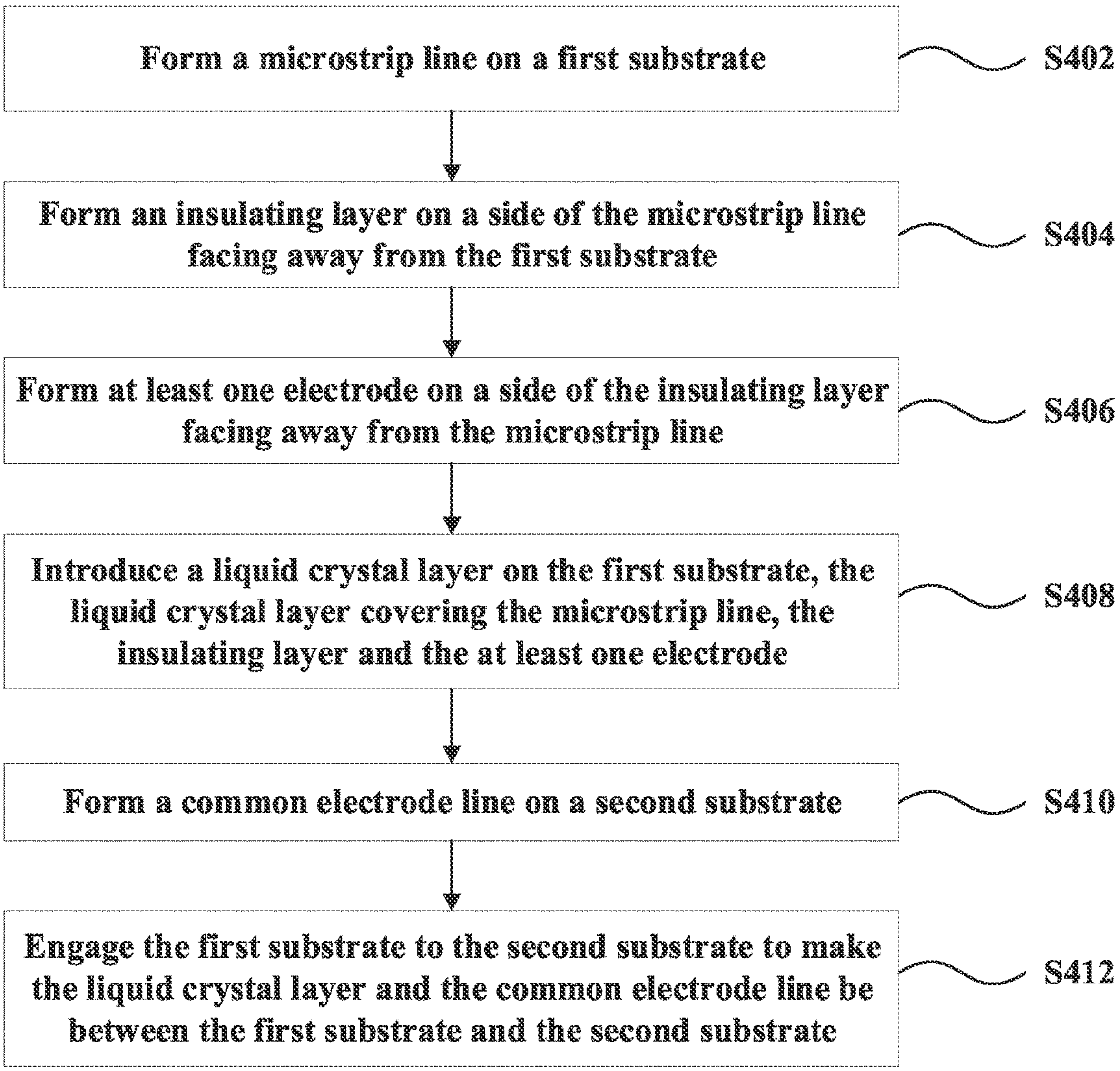
FIG. 4 is a flowchart illustrating a manufacturing method for a signal conditioner according to an embodiment of the present disclosure.

FIG. 4 is a flowchart illustrating a manufacturing method for a signal conditioner according to an embodiment of the present disclosure. As shown in FIG. 4, the manufacturing method comprises steps S402 to S412.

At step S402, a microstrip line is formed on a first substrate. The microstrip line comprises a first portion and a second portion. A first end of the first portion is connected to a first end of the second portion, and a second end of the first portion is connected to a second end of the second portion.

At step S404, an insulating layer is formed on a side of the microstrip line facing away from the first substrate. The insulating layer comprises a first insulating layer covering the first portion.

At step S406, at least one electrode is formed on a side of the insulating layer facing away from the microstrip line. The at least one electrode comprises a first electrode. The first electrode is formed on a side of the first insulating layer facing away from the first portion.

At step S408, a liquid crystal layer covering the microstrip line, the insulating layer, and the at least one electrode is introduced on the first substrate.

At step S410, a common electrode line is formed on a second substrate.

At step S412, the first substrate is engaged to the second substrate to make the liquid crystal layer and the common electrode line be between the first substrate and the second substrate. By engaging the first substrate to the second substrate, the microstrip line, the insulating layer, the at least one electrode, the liquid crystal layer and the common electrode line are all between these two substrates.

In the above embodiment, a manufacturing method for a signal conditioner according to some embodiments of the present disclosure is provided. In the manufacturing method, a microstrip line on a first substrate, an insulating layer on the microstrip line, an electrode on the insulating layer, and a liquid crystal layer covering the microstrip line, the insulating layer, and the electrode are formed. A common electrode line is formed on a second substrate. Then, the first substrate is engaged to the second substrate so that the microstrip line, the insulating layer, the electrode, the liquid crystal layer, and the common electrode line are between the two substrates. In this way, a signal conditioner that may adjust an amplitude of an electromagnetic wave signal is formed.

In some embodiments, the insulating layer may further comprises a second insulating layer covering the second portion in the forming of the insulating layer. The at least one electrode may further comprises a second electrode in the forming of the at least one electrode. The second electrode is formed on a side of the second insulating layer facing away from the second portion. The second electrode is isolated from the first electrode. In this embodiment, the second electrode is formed above the second portion of the microstrip line. The second electrode is isolated from the second portion of the microstrip line by the second insulating layer.

In some embodiments, the microstrip line may further comprises a third portion in the forming of the microstrip line. A first end of the third portion is connected to the second end of the first portion. The insulating layer may further comprises a third insulating layer covering the third portion in the forming of the insulating layer. The at least one electrode further comprises a third electrode in the forming of the at least one electrode. The third electrode is formed on a side of the third insulating layer facing away from the third portion. The third electrode is isolated from the first electrode and the second electrode, respectively. In the embodiment, the third portion of the microstrip line and the third electrode above the third portion are formed. The third electrode is isolated from the third portion of the microstrip line by the third insulating layer.

FIGS. 5A-5B, 6A-6B, 7A-7B, 8A-8B, 9, 2B, and 3B are cross-sectional views showing structures at several stages in the manufacturing method for a signal conditioner according to some embodiments of the present disclosure. Here, FIGS. 5A, 6A, 7A, 8A, and 2B are cross-sectional views showing structures at several stages taken along, for example, line D-D' in FIG. 3A. FIGS. 5B, 6B, 7B, 8B, and 3B are cross-sectional views showing structures at several stages taken along, for example, line C-C' in FIG. 3A. The manufacturing process of the signal conditioner according to some embodiments of the present disclosure will be described in detail below in conjunction with these drawings.

Figure 5A:
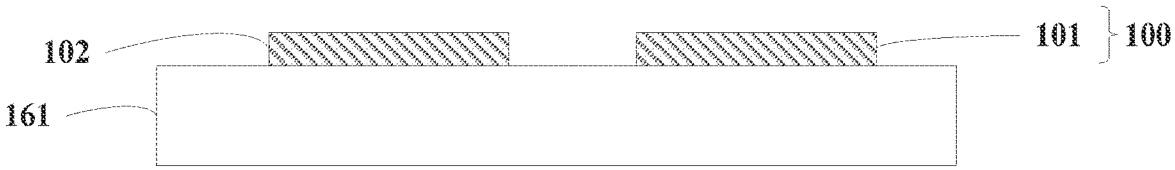
FIG. 5A is a cross-sectional view showing a structure at a stage in a manufacturing method for a signal conditioner according to an embodiment of the present disclosure.

First, as shown in FIG. 5A, a microstrip line 100 is formed on a first substrate 161. The microstrip line 100 comprises a first portion 101 and a second portion 102. A first end of the first portion 101 is connected to a first end of the second portion 102, and a second end of the first portion 101 is connected to a second end of the second portion 102 (refer to FIG. 3A, not shown in FIG. 5A). For example, a patterned microstrip line 100 may be formed on the first substrate 161 through processes such as deposition and etching. A material of the microstrip line 100 may comprise conductive materials such as ITO or a metal.

Figure 5B:
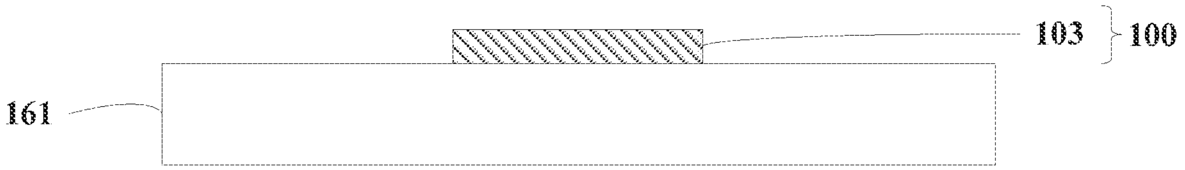
FIG. 5B is a cross-sectional view showing a structure at a stage in a manufacturing method for a signal conditioner according to an embodiment of the present disclosure.

In some embodiments, as shown in FIG. 5B, the microstrip line 100 may further comprise a third portion 103. A first end of the third portion 103 is connected to the second end of the first portion 101 (refer to FIG. 3A, not shown in FIG. 5B).

Figure 6A:
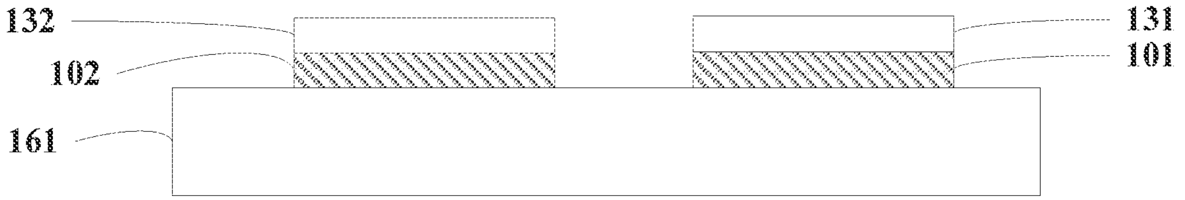
FIG. 6A is a cross-sectional view showing a structure at another stage in a manufacturing method for a signal conditioner according to an embodiment of the present disclosure.
Figure 6B:
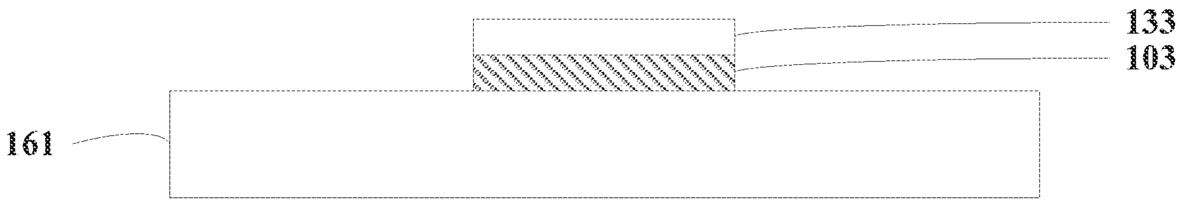
FIG. 6B is a cross-sectional view showing a structure at another stage in a manufacturing method for a signal conditioner according to an embodiment of the present disclosure.

Next, an insulating layer is formed on a side of the microstrip line 100 facing away from the first substrate 161. For example, as shown in FIG. 6A, the insulating layer may comprise a first insulating layer 131 covering the first portion 101. For another example, as shown in FIG. 6A, the insulating layer may further comprise a second insulating layer 132 covering the second portion 102. For another example, as shown in FIG. 6B, the insulating layer may further comprise a third insulating layer 133 covering the third portion 103. For example, a patterned insulating layer may be formed by processes such as deposition and etching. A material of the insulating layer may comprise silicon dioxide, silicon nitride, or the like.

Figure 7A:
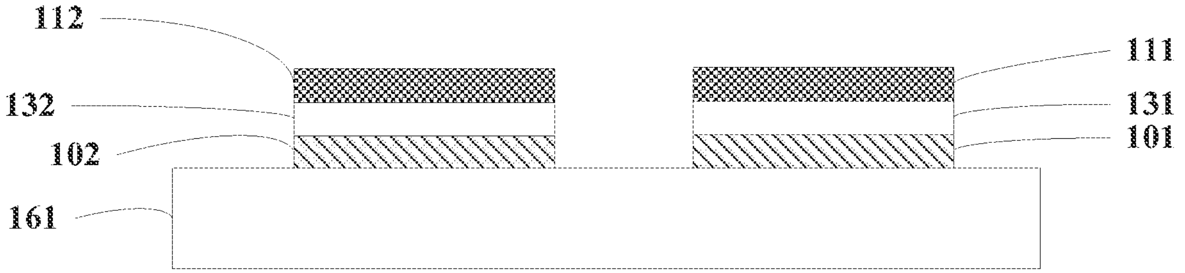
FIG. 7A is a cross-sectional view showing a structure at another stage in a manufacturing method for a signal conditioner according to an embodiment of the present disclosure.

Next, at least one electrode is formed on a side of the insulating layer facing away from the microstrip line 100. For example, as shown in FIG. 7A, the at least one electrode may comprise a first electrode 111. The first electrode 111 is formed on a side of the first insulating layer 131 facing away from the first portion 101. The first electrode is formed on a surface of the first insulating layer 131.

For another example, as shown in FIG. 7A, the at least one electrode may further comprise a second electrode 112 in the process of forming the at least one electrode. The second electrode 112 is formed on a side of the second insulating layer 132 facing away from the second portion 102. The second electrode 112 is formed on a surface of the second insulating layer 132. The second electrode 112 is isolated from the first electrode 111.

Figure 7B:
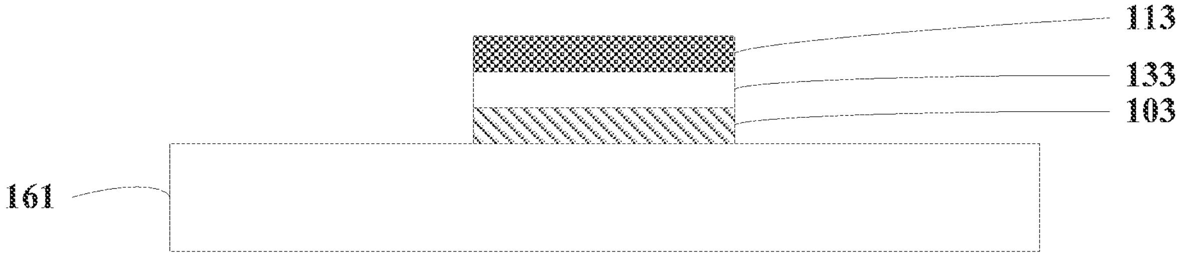
FIG. 7B is a cross-sectional view showing a structure at another stage in a manufacturing method for a signal conditioner according to an embodiment of the present disclosure.

For another example, as shown in FIG. 7B, the at least one electrode may further comprise a third electrode 113 in the process of forming the at least one electrode. The third electrode 113 is formed on a side of the third insulating layer 133 facing away from the third portion 103. The third electrode 113 is formed on a surface of the third insulating layer 133. The third electrode 113 is isolated from the first electrode 111 and the second electrode 112, respectively.

Figure 8A:
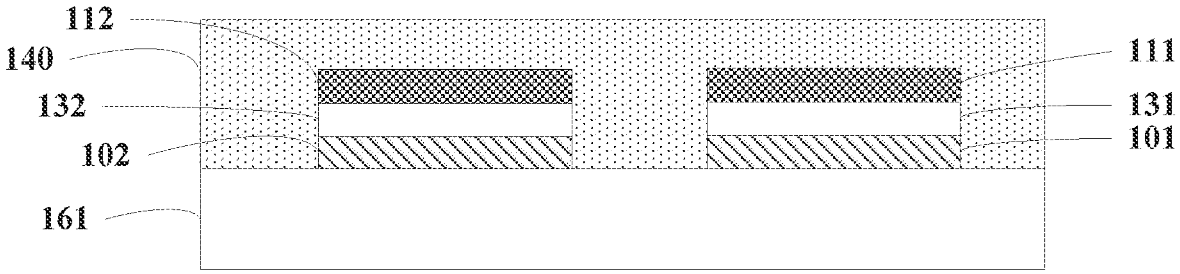
FIG. 8A is a cross-sectional view showing a structure at another stage in a manufacturing method for a signal conditioner according to an embodiment of the present disclosure.
Figure 8B:
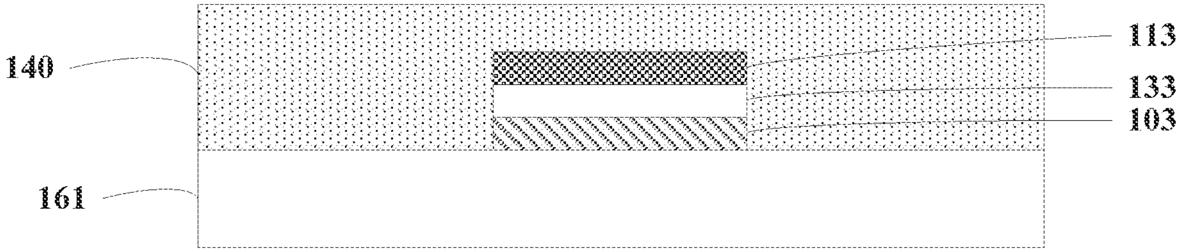
FIG. 8B is a cross-sectional view showing a structure at another stage in a manufacturing method for a signal conditioner according to an embodiment of the present disclosure.

Next, as shown in FIGS. 8A and 8B, a liquid crystal layer 140 covering the microstrip line 100, the insulating layer (for example, the first insulating layer 131, the second insulating layer 132, and the third insulating layer 133) and the at least one electrode (for example, the first electrode 111, the second electrode 112, and the third electrode 113) is introduced on the first substrate 161. For example, an encapsulant surrounding the microstrip line, the insulating layer, and the at least one electrode is formed on the first substrate, and a liquid crystal material is introduced into the encapsulant on the first substrate to form the liquid crystal layer.

Figure 9:
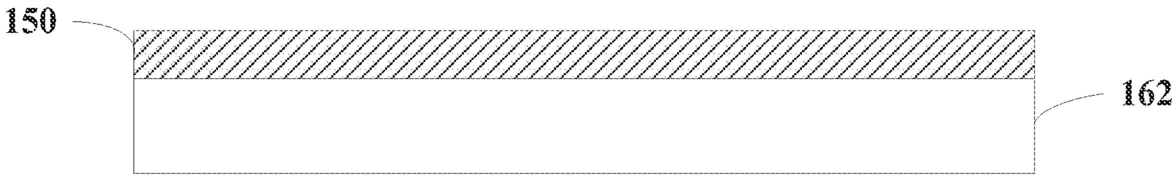
FIG. 9 is a cross-sectional view showing the structure at another stage in a manufacturing method for a signal conditioner according to an embodiment of the present disclosure.

Next, as shown in FIG. 9, a common electrode line 150 is formed on a second substrate 162. For example, the common electrode line may be formed through processes such as deposition and etching. A material of the common electrode line comprises conductive materials such as ITO or a metal.

Next, as shown in FIGS. 2B and 3B, the first substrate 161 is engaged to the second substrate 162 so that the microstrip line 100, the insulating layer, the at least one electrode, the liquid crystal layer 140, and the common electrode line 150 are all between the first substrate and the second substrate.

So far, a manufacturing method for a signal conditioner according to some embodiments of the present disclosure is provided. A signal conditioner is formed by the manufacturing method. The signal conditioner may be used to adjust at least one of an amplitude or phase of an electromagnetic wave signal.

Figure 10:
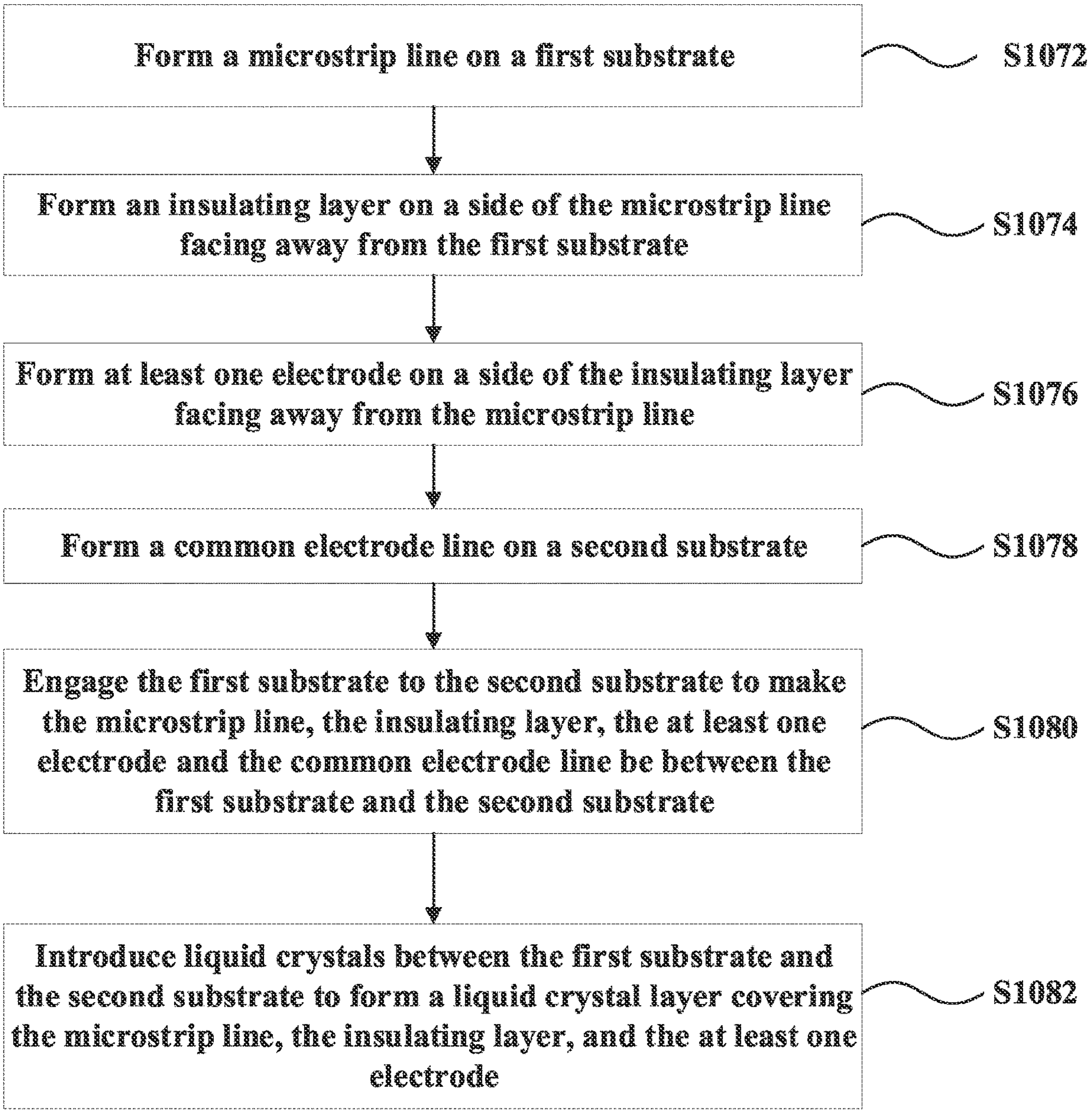
FIG. 10 is a flowchart showing a manufacturing method for a signal conditioner according to another embodiment of the present disclosure.

FIG. 10 is a flowchart showing a manufacturing method for a signal conditioner according to another embodiment of the present disclosure. As shown in FIG. 10, the manufacturing method comprises steps S1072 to S1082.

At step S1072, a microstrip line is formed on a first substrate. The microstrip line comprises a first portion and a second portion. A first end of the first portion is connected to a first end of the second portion, and a second end of the first portion is connected to a second end of the second portion.

At step S1074, an insulating layer is formed on a side of the microstrip line facing away from the first substrate. The insulating layer comprises a first insulating layer covering the first portion.

At step S1076, at least one electrode is formed on a side of the insulating layer facing away from the microstrip line. The at least one electrode comprises a first electrode. The first electrode is formed on a side of the first insulating layer facing away from the first portion.

At step S1078, a common electrode line is formed on a second substrate.

At step S1080, the first substrate is engaged to the second substrate to make the microstrip line, the insulating layer, the at least one electrode, and the common electrode line be between the first substrate and the second substrate.

At step S1082, liquid crystals are introduced between the first substrate and the second substrate to form a liquid crystal layer covering the microstrip line, the insulating layer, and the at least one electrode. A portion of the liquid crystal layer is between the microstrip line and the common electrode line.

In the above embodiments, a manufacturing method for a signal conditioner according to other embodiments of the present disclosure is provided. In the manufacturing method, a microstrip line on a first substrate, an insulating layer on the microstrip line, and an electrode on the insulating layer are formed. A common electrode line is formed on a second substrate. Then, the first substrate is engaged to the second substrate so that the microstrip line, the insulating layer, the electrode, and the common electrode line are between the first substrate and the second substrate. Next, a liquid crystal material is introduced between the first substrate and the second substrate to form the liquid crystal layer. In this way, a signal conditioner that may be used to adjust an amplitude of an electromagnetic wave signal is formed.

In some embodiments, the insulating layer may further comprises a second insulating layer covering the second portion in the forming of the insulating layer. The at least one electrode may further comprises a second electrode formed on a side of the second insulating layer facing away from the second portion in the forming of the at least one electrode. The second electrode is isolated from the first electrode. In this embodiment, the second electrode is formed above the second portion of the microstrip line. The second electrode is isolated from the second portion of the microstrip line by the second insulating layer.

In some embodiments, the microstrip line may further comprises a third portion in the forming of the microstrip line. A first end of the third portion is connected to the second end of the first portion. The insulating layer may further comprises a third insulating layer covering the third portion in the forming of the insulating layer. The at least one electrode may further comprises a third electrode in the forming of the at least one electrode. The third electrode is formed on a side of the third insulating layer facing away from the third portion. The third electrode is isolated from the first electrode and the second electrode, respectively. In this embodiment, the third portion of the microstrip line and the third electrode above the third portion are formed. The third electrode is isolated from the third portion of the microstrip line by the third insulating layer.

FIGS. 5A-5B, 6A-6B, 7A-7B, 9, 11A-11B, 2B and 3B are cross-sectional views showing structures at several stages in the manufacturing method for a signal conditioner according to other embodiments of the present disclosure. Here, FIGS. 5A, 6A, 7A, 11A, and 2B are cross-sectional views showing structures at several stages taken along, for example, line D-D' in FIG. 3A. FIGS. 5B, 6B, 7B, 11B, and 3B are cross-sectional views showing structures at several stages taken along, for example, line C-C' in FIG. 3A. The manufacturing process of the signal conditioner according to other embodiments of the present disclosure will be described in detail below in conjunction with these drawings.

Several steps have been described above in detail in conjunction with the structures shown in FIGS. 5A-5B, 6A-6B, and 7A-7B, which will not be repeated here. After these steps, a microstrip line 100 (for example, the microstrip line may comprise a first portion 101, a second portion 102, and a third portion 103) on the first substrate 161, an insulating layer (for example, the insulating layer may comprise a first insulating layer 131, a second insulating layer 132, and a third insulating layer 133) on the microstrip line 100, and at least one electrode (for example, the at least one electrode may comprise a first electrode 111, a second electrode 112, and a third electrode 113) on the insulating layer are formed.

Next, as shown in FIG. 9, a common electrode line 150 is formed on a second substrate 162.

Figure 11A:
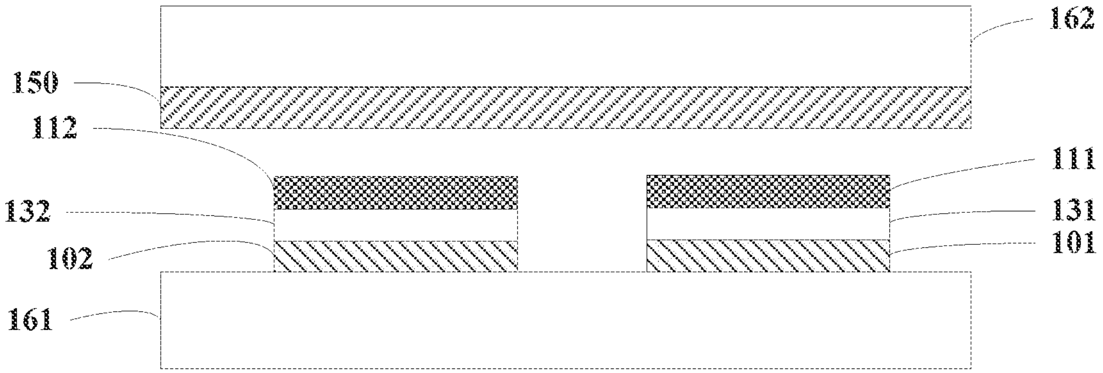
FIG. 11A is a cross-sectional view showing a structure at a stage in a manufacturing method for a signal conditioner according to another embodiment of the present disclosure.
Figure 11B:
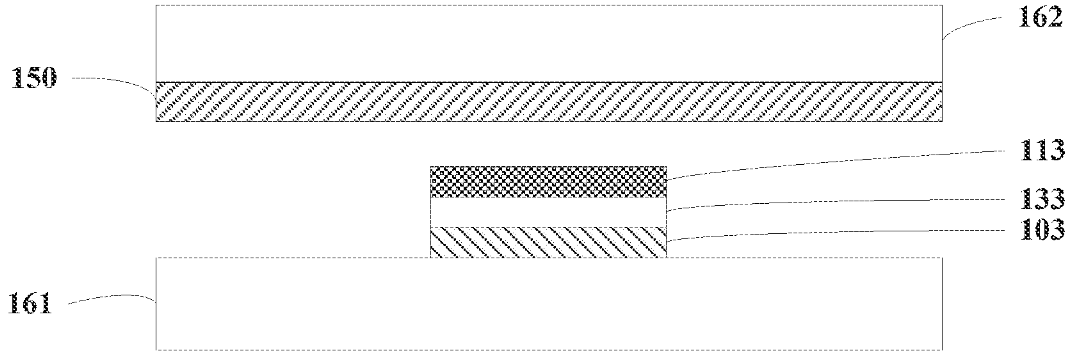
FIG. 11B is a cross-sectional view showing a structure at a stage in a manufacturing method for a signal conditioner according to another embodiment of the present disclosure.

Next, as shown in FIGS. 11A and 11B, the first substrate 161 is engaged to the second substrate 162 so that the microstrip line 100, the insulating layer, the at least one electrode, and the common electrode line 150 are between the first substrate 161 and the second substrates 162. For example, the first substrate may be engaged to the second substrate by an encapsulant.

Next, as shown in FIGS. 2B and 3B, a liquid crystal material is introduced between the first substrate 161 and the second substrate 162 to form a liquid crystal layer 140 covering the microstrip line 100, the insulating layer, and the at least one electrode. A portion of the liquid crystal layer 140 is between the microstrip line 100 and the common electrode line 150.

So far, a manufacturing method for a signal conditioner according to other embodiments of the present disclosure is provided. A signal conditioner is formed by the manufacturing method. The signal conditioner may be used to adjust an amplitude and a phase of an electromagnetic wave signal.

Figure 12:
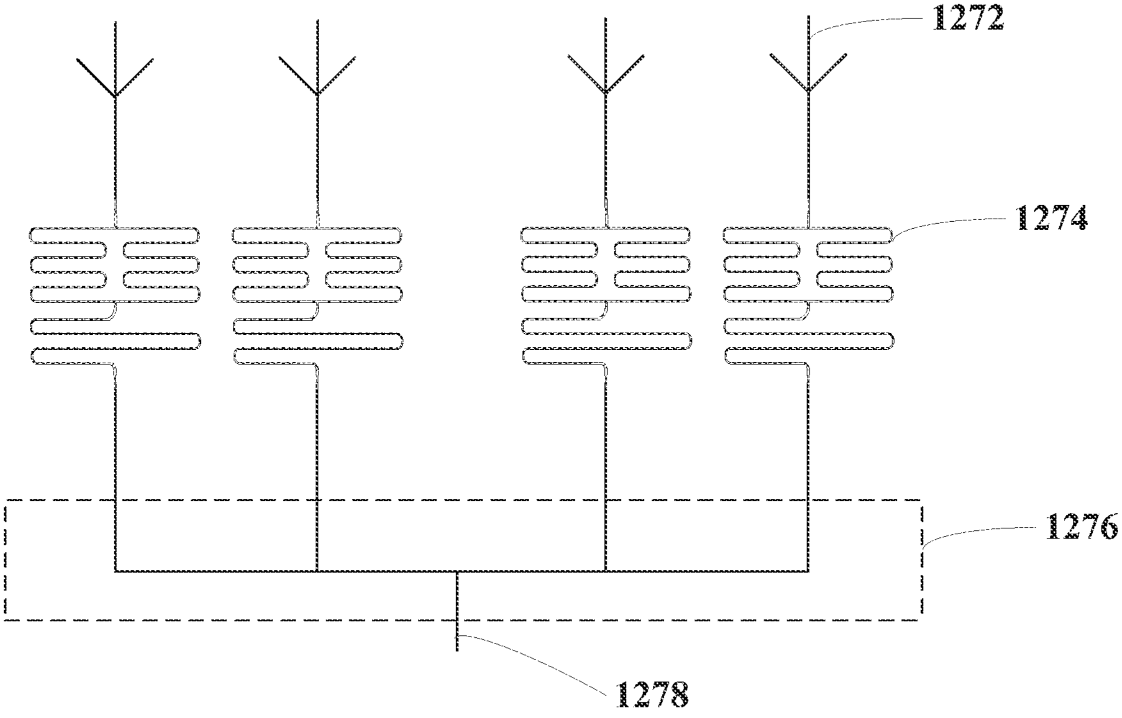
FIG. 12 is a schematic diagram showing a structure of an antenna device according to an embodiment of the present disclosure.

FIG. 12 is a schematic diagram showing a structure of an antenna device according to an embodiment of the present disclosure.

As shown in FIG. 12, the antenna device may comprise at least one signal conditioner 1274 and at least one antenna circuit 1272. For example, the signal conditioner 1274 may be the aforementioned signal conditioner, such as the signal conditioner shown in FIG. 1A, FIG. 2A, or FIG. 3A. As shown in FIG. 12, the at least one antenna circuit 1272 is electrically connected to the at least one signal conditioner 1274. In this antenna device, through providing the aforementioned signal conditioner, at least one of an amplitude or a phase of an electromagnetic wave signal may be adjusted. This may reduce sidelobes of the directional pattern of the antenna device, thereby improving the anti-interference ability of the antenna device.

In some embodiments, as shown in FIG. 12, the at least one signal conditioner 1274 comprises a plurality of signal conditioners 1274, and the at least one antenna circuit 1272 comprises a plurality of antenna circuits 1272. For example, the plurality of signal conditioners 1274 are electrically connected to the plurality of antenna circuits 1272 in one-to-one correspondence. The antenna device may further comprise a signal transmission circuit 1276. The signal transmission circuit 1276 is electrically connected to the plurality of signal conditioners 1274. The signal transmission circuit 1276 may comprise at least one of a power splitter or a combiner.

In some embodiments, as shown in FIG. 12, the antenna device may further comprise a transmission port 1278.

In the antenna device (for example, a phased array antenna device) of the above embodiment, an electromagnetic wave signal may be input to the signal conditioner 1274 through the transmission port 1278 and the signal transmission circuit 1276. After at least one of the amplitude or the phase of the signal is adjusted by the signal conditioner 1274, the adjusted signal is transmitted through the antenna circuit 1272. In other embodiments, the electromagnetic wave signal is received by the antenna circuit 1272 and transmitted to the signal conditioner 1274. After at least one of the amplitude or the phase of the signal is adjusted by the signal conditioner 1274, the adjusted signal is transmitted to other devices through the signal transmission circuit 1276 and the transmission port 1278. The antenna device may achieve the adjustment of at least one of the amplitude or the phase of the electromagnetic wave signal.

Heretofore, various embodiments of the present disclosure have been described in detail. In order to avoid obscuring the concepts of the present disclosure, some details known in the art are not described. Based on the above description, those skilled in the art can understand how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments or equivalently substitution of part of the technical features may be made without departing from the scope and spirit of the present disclosure. The scope of the present disclosure is defined by the appended claims.

What is claimed is:

1. A signal conditioner, comprising:

a microstrip line located on a first substrate and comprising a first portion and a second portion, wherein a first end of the first portion is connected to a first end of the second portion, and a second end of the first portion is connected to a second end of the second portion;

an insulating layer comprising a first insulating layer covering the first portion;

at least one electrode comprising a first electrode on a side of the first insulating layer facing away from the first portion, wherein an extension direction of the first electrode is the same as an extension direction of the first portion of the microstrip line;

a liquid crystal layer covering the microstrip line, the insulating layer and the at least one electrode; and a common electrode line on a side of the liquid crystal layer facing away from the microstrip line, wherein an orthographic projection of the common electrode line on the first substrate covers an orthographic projection of the first electrode on the first substrate.

2. The signal conditioner according to claim 1, wherein:

the insulating layer further comprises a second insulating layer covering the second portion; and the at least one electrode further comprises a second electrode on a side of the second insulating layer facing away from the second portion, the second electrode being isolated from the first electrode by a portion of the liquid crystal layer, wherein an extension direction of the second electrode is the same as an extension direction of the second portion of the microstrip line.

3. The signal conditioner according to claim 2, wherein a length L1 of the first electrode and a length L2 of the second electrode satisfy the following condition:

$$L1 = L2 \geq \frac{c}{2f\left(\sqrt{\varepsilon_{\parallel}} - \sqrt{\varepsilon_{\perp}}\right)},$$

where c is a speed of light, f is a frequency of a transmitted signal, $\varepsilon_{\parallel}$ is a dielectric constant of liquid crystals in a case where an arrangement direction of long axis of liquid crystal molecules is parallel to a direction of a driving electric field applied to the liquid crystals, and $\varepsilon_{\perp}$ is a dielectric constant of liquid crystals in a case where the arrangement direction of the long axis of the liquid crystal molecules is perpendicular to the direction of the driving electric field applied to the liquid crystals.

4. The signal conditioner according to claim 2, wherein a width of the first electrode is equal to a width of the second electrode.

5. The signal conditioner according to claim 1, wherein the first portion and the second portion each has a curved shape.

6. The signal conditioner according to claim 2, wherein:

the microstrip line further comprises a third portion, a first end of the third portion being connected to the second end of the first portion;

the insulating layer further comprises a third insulating layer covering the third portion; and the at least one electrode further comprises a third electrode on a side of the third insulating layer facing away from the third portion, the third electrode being isolated from the first electrode and the second electrode by a portion of the liquid crystal layer, wherein an extension direction of the third electrode is the same as an extension direction of the third portion of the microstrip line.

7. The signal conditioner according to claim 6, wherein:

the orthographic projection of the common electrode line on the first substrate covers an orthographic projection of the second electrode on the first substrate; and the orthographic projection of the common electrode line on the first substrate covers an orthographic projection of the third electrode on the first substrate.

8. The signal conditioner according to claim 6, wherein a length L3 of the third electrode satisfies the following condition:

$$L3 \geq \frac{c}{f\left(\sqrt{\varepsilon_{\parallel}} - \sqrt{\varepsilon_{\perp}}\right)},$$

where c is a speed of light, f is a frequency of a transmitted signal, $\varepsilon_{\parallel}$ is a dielectric constant of liquid crystals in a case where an arrangement direction of long axis of liquid crystal molecules is parallel to a direction of a driving electric field applied to the liquid crystals, and $\varepsilon_{\perp}$ is a dielectric constant of liquid crystals in a case where the arrangement direction of the long axis of the liquid crystal molecules is perpendicular to the direction of the driving electric field applied to the liquid crystals.

9. The signal conditioner according to claim 6, further comprising:

a first radio frequency port connected to the first end of the first portion; and a second radio frequency port connected to a second end of the third portion.

10. The signal conditioner according to claim 9, wherein the second portion and the first portion are arranged symmetrically with respect to a line where an extension direction of the first radio frequency port is located.

11. The signal conditioner according to claim 1, further comprising the first substrate and a second substrate, wherein:

the microstrip line, the insulating layer, the at least one electrode, the liquid crystal layer, and the common electrode line are between the first substrate and the second substrate;

the microstrip line, the insulating layer, and the at least one electrode are on the first substrate; and the common electrode line is on the second substrate.

12. An antenna device, comprising:

at least one signal conditioner according to claim 1; and at least one antenna circuit electrically connected to the at least one signal conditioner.

13. The antenna device according to claim 12, further comprising a signal transmission circuit, the signal transmission circuit comprising at least one of a power splitter or a combiner, wherein:

the at least one signal conditioner comprises a plurality of signal conditioners;

the at least one antenna circuit comprises a plurality of antenna circuits; and the signal transmission circuit is electrically connected to the plurality of signal conditioners.

14. A manufacturing method for a signal conditioner, comprising:

forming a microstrip line on a first substrate, wherein the microstrip line comprises a first portion and a second portion, a first end of the first portion being connected to a first end of the second portion, and a second end of the first portion being connected to a second end of the second portion;

forming an insulating layer on a side of the microstrip line facing away from the first substrate, wherein the insulating layer comprises a first insulating layer covering the first portion;

forming at least one electrode on a side of the insulating layer facing away from the microstrip line, wherein the at least one electrode comprises a first electrode formed on a side of the first insulating layer facing away from the first portion, wherein an extension direction of the first electrode is the same as an extension direction of the first portion of the microstrip line;

introducing a liquid crystal layer on the first substrate, the liquid crystal layer covering the microstrip line, the insulating layer and the at least one electrode;

forming a common electrode line on a second substrate; and engaging the first substrate to the second substrate to make the liquid crystal layer and the common electrode line be between the first substrate and the second substrate, wherein an orthographic projection of the common electrode line on the first substrate covers an orthographic projection of the first electrode on the first substrate.

15. The manufacturing method according to claim 14, wherein:

the insulating layer further comprises a second insulating layer covering the second portion in the forming of the insulating layer; and the at least one electrode further comprises a second electrode formed on a side of the second insulating layer facing away from the second portion in the forming of the at least one electrode, and isolated from the first electrode.

16. The manufacturing method according to claim 15, wherein:

the microstrip line further comprises a third portion in the forming of the microstrip line, a first end of the third portion being connected to the second end of the first portion;

the insulating layer further comprises a third insulating layer covering the third portion in the forming of the insulating layer; and the at least one electrode further comprises a third electrode formed on a side of the third insulating layer facing away from the third portion in the forming of the at least one electrode, the third electrode being isolated from the first electrode and the second electrode, respectively.

17. A signal conditioner, comprising:

a microstrip line comprising a first portion and a second portion, wherein a first end of the first portion is connected to a first end of the second portion, and a second end of the first portion is connected to a second end of the second portion;

an insulating layer comprising a first insulating layer covering the first portion and a second insulating layer covering the second portion;

at least one electrode comprising a first electrode on a side of the first insulating layer facing away from the first portion and a second electrode on a side of the second insulating layer facing away from the second portion, wherein the second electrode is isolated from the first electrode, and the first electrode and the second electrode are symmetrically arranged;

a liquid crystal layer covering the microstrip line, the insulating layer and the at least one electrode; and a common electrode line on a side of the liquid crystal layer facing away from the microstrip line.

* * * * *